(12) United States Patent
Sawamukai et al.

(10) Patent No.: US 7,819,178 B2
(45) Date of Patent: Oct. 26, 2010

(54) VEHICLE AIR CONDITIONER WITH FLOW DIVERTING MEANS

(75) Inventors: Tomoaki Sawamukai, Shioya-gun (JP); Shintaro Ikeda, Shioya-gun (JP)

(73) Assignee: Keihin Corporation, Tokyo (JP)

(*) Notice: Subject to any disclaimer, the term of this patent is extended or adjusted under 35 U.S.C. 154(b) by 1064 days.

(21) Appl. No.: 11/494,022

(22) Filed: Jul. 26, 2006

(65) Prior Publication Data
US 2007/0023181 A1 Feb. 1, 2007

(30) Foreign Application Priority Data
Jul. 29, 2005 (JP) ............................. 2005-220886

(51) Int. Cl.
*B60H 1/00* (2006.01)
*B60H 3/00* (2006.01)
*B60H 1/02* (2006.01)
*F28F 27/00* (2006.01)
*F28F 27/02* (2006.01)

(52) U.S. Cl. ........................... 165/202; 165/42; 165/43; 165/203; 165/204; 165/96; 165/100; 165/103; 454/160; 454/161

(58) Field of Classification Search .................. 165/42, 165/43, 202, 203, 204, 96, 100, 103; 454/160, 454/161
See application file for complete search history.

(56) References Cited

U.S. PATENT DOCUMENTS

| | | | |
|---|---|---|---|
| 6,478,671 B2 * | 11/2002 | Murai et al. ................ | 454/156 |
| 6,588,496 B2 * | 7/2003 | Nakagawa et al. ............ | 165/42 |
| 6,991,027 B2 | 1/2006 | Ozeki et al. | |
| 2003/0003859 A1 | 1/2003 | Nakagawa et al. | |

FOREIGN PATENT DOCUMENTS

| | | |
|---|---|---|
| CN | 1396069 | 2/2003 |
| JP | 10-35251 | 2/1998 |
| JP | 10-236134 | 9/1998 |
| JP | 2000-071748 | 3/2000 |
| JP | 2002-274149 | 9/2002 |
| JP | 2004-058940 | 2/2004 |

OTHER PUBLICATIONS

Chinese Office Action for Application No. 200610108956.9, dated Oct. 26, 2007.

* cited by examiner

*Primary Examiner*—Frantz F. Jules
*Assistant Examiner*—Travis Ruby
(74) *Attorney, Agent, or Firm*—Lahive & Cockfield, LLP; Anthony A. Laurentano, Esq.

(57) ABSTRACT

A vehicular air conditioner includes a housing having a rear seat discharge passage for supplying mixed air to rear seats in a vehicle and a plurality of dividing ribs disposed in a face outlet which is open upwardly in the housing. Each of the dividing ribs has a communication path defined therein in the longitudinal direction thereof, the communication path being concave in confronting relation to the interior of the housing. Mixed air produced in a mixing portion in the housing is supplied from the face outlet to front seats in the vehicle. Part of the mixed air is supplied through the communication paths to the rear seat discharge passage, from which the mixed air is supplied to the rear seats.

12 Claims, 13 Drawing Sheets

VEHICLE AIR CONDITIONER WITH FLOW DIVERTING MEANS

BACKGROUND OF THE INVENTION

1. Field of the Invention

The present invention relates to a vehicular air conditioner having a cooling unit and a heating unit, for adjusting the temperature in a vehicle cabin with the cooling unit and the heating unit.

2. Description of the Related Art

Vehicular air conditioners installed on vehicles adjust the temperature and humidity in the passenger compartment by mixing air cooled by an evaporator serving as a cooling unit and air heated by a heater core serving as a heating unit with each other at a desired mixing ratio and thereafter delivering the mixed air from a defroster outlet, a face outlet, or a foot outlet of the passenger compartment into the passenger compartment.

In such vehicular air conditioners, the air cooled by the evaporator flows substantially straight from an air mixing door through a cooling air passage defined in a housing into a mixing chamber. Part of the air is introduced into a hot air passage and heated by the heater core. The heated air flows upwardly through the housing into the mixing chamber. The air introduced into the cooling air passage is mixed with the heated air in the mixing chamber, so that the mixed air is adjusted to a desired temperature. The mixed air is then supplied through a set of discharge switching doors selectively to a defroster air passage, a face air passage, or a foot air passage. For details, see Japanese Laid-Open Patent Publication No. 10-236134 and Japanese Laid-Open Patent Publication No. 2002-274149, for example.

In recent years, there has been employed in the art a vehicular air conditioner which is capable of supplying air that has been adjusted to a desired temperature to rear seats as well as front seats in the vehicle passenger compartment.

Figure 13:
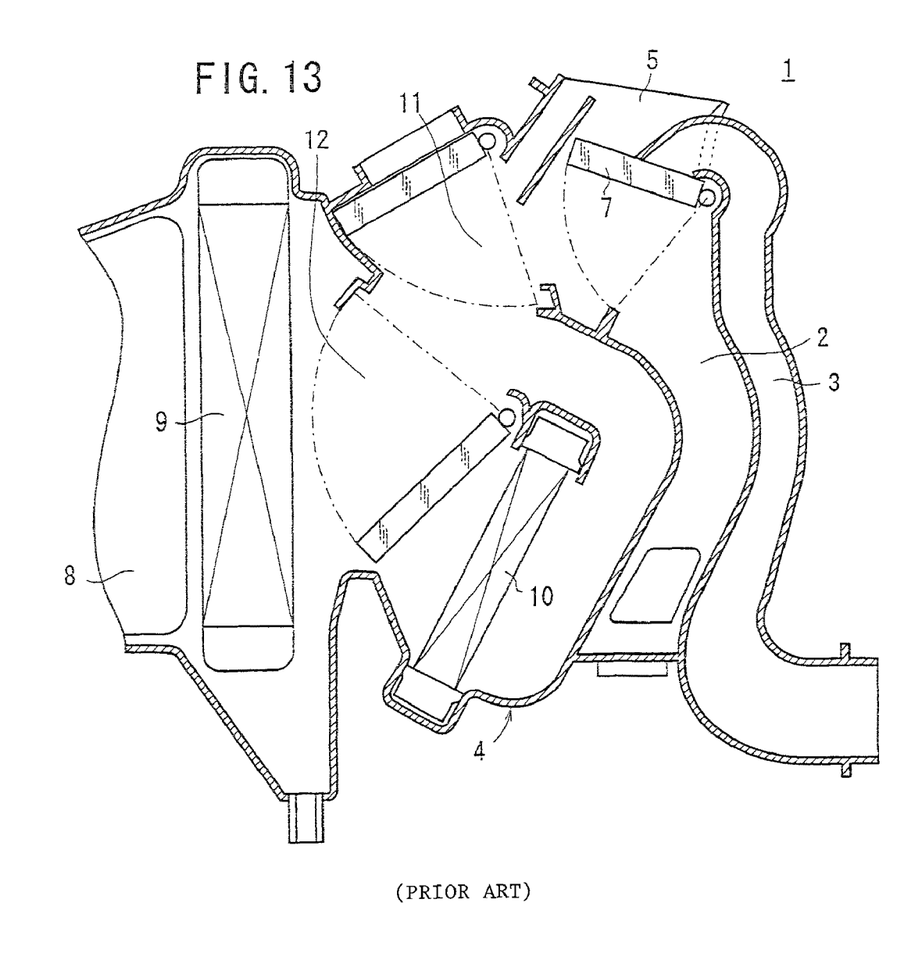
FIG. 13 is a vertical cross-sectional view of a conventional vehicular air conditioner.

As shown in FIG. 13 of the accompanying drawings, such a vehicular air conditioner 1 has a rear seat face air passage 3 communicating with rear seat face openings that are open toward the rear seats. The rear seat face air passage 3 is defined adjacent to a foot air passage 2 in an air conditioner case 4. The air conditioner case 4 houses therein a foot/face switching door 7 for switching between the rear seat face air passage 3, a face opening 5, and the foot air passage 2. Air introduced from an air inlet 8 defined in the air conditioner case 4 is cooled by an evaporator 9 housed in the air conditioner case 4. Part of the air is heated by a heater core 10 housed in the air conditioner case 4. The cooled air and the heated air are mixed with each other by an air mixing portion 11, so that the mixed air is adjusted to a desired temperature. The mixed air is supplied by the foot/face switching door 7 selectively to the rear seat face air passage 3, the face opening 5, and the foot air passage 2. For details, see Japanese Laid-Open Patent Publication No. 2000-71748, for example.

The vehicular air conditioner disclosed in Japanese Laid-Open Patent Publication No. 2000-71748 adds the rear seat face air passage 3 for supplying temperature-adjusted air to rear seats, to the vehicular air conditioners disclosed in Japanese Laid-Open Patent Publication No. 10-236134 and Japanese Laid-Open Patent Publication No. 2002-274149.

Generally, the vehicular air conditioner 1 is required to mix the cooled air and the heated air into well mixed air in order to increase the comfort of passengers in the passenger compartment.

In the vehicular air conditioner 1, the air supplied from the air inlet 8 is cooled by the evaporator 9 and flows substantially straight through an air passage 12 into the air mixing portion 11, and the air supplied to the heater core 10 is heated by the heater core 10 and then flows upwardly into the air mixing portion 11. Therefore, in the air mixing portion 11 where the cooled air and the heated air are mixed with each other, the cooled air tends to flow through an upper portion of the air conditioner case 4 into the face opening 5, and the heated air tends to flow along the foot/face switching door 7 into the rear seat face air passage 3 and the foot air passage 2.

As a result, the temperature of the air discharged from the face opening 5 into the passenger compartment and the temperature of the air delivered through the rear seat face air passage 3 and discharged from the rear seat face opening into the passenger compartment are liable to differ from each other. Specifically, the temperature of the air discharged from the rear seat face opening tends to be higher than the temperature of the air discharged from the face opening 5 which opens toward the front seats. As a consequence, the temperature of the air delivered to the rear seats tends to be higher than the temperature of the air delivered to the front seats. Therefore, the passengers on the rear seats do not feel as comfortable as the passengers on the front seats.

Another problem is that since the mixed air produced in the air conditioner case 4 needs to be supplied from the air conditioner case 4 through the rear seat face air passage 3 to the rear seats, the discharged air undergoes a large resistance as it flows through an air passage extending from the air conditioner case 4 to the rear seats. The amount of air delivered from the rear seat face opening to the rear seats is thus relatively small. Therefore, the rear seats are not supplied with the same amount of air as the front seats from the vehicular air conditioner 1, and the passengers on the rear seats do not feel as comfortable as the passengers on the front seats.

SUMMARY OF THE INVENTION

It is a general object of the present invention to provide a vehicular air conditioner which is capable of supplying vehicle rear seats with an increased amount of mixed air and of reducing the difference between the temperature of mixed air supplied to vehicle front seats and the temperature of mixed air supplied to vehicle rear seats.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
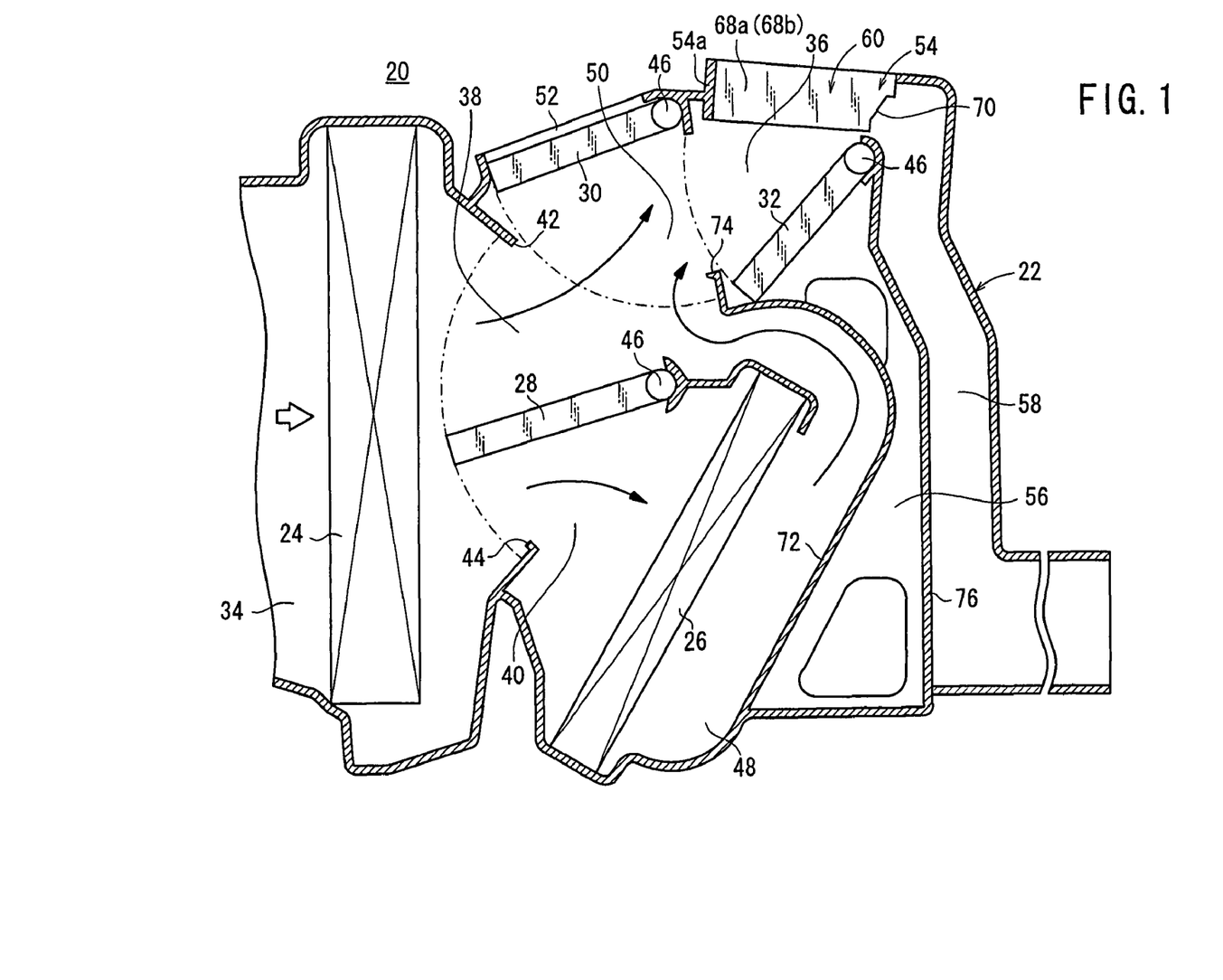
FIG. 1 is a partially omitted, vertical cross-sectional view of a vehicular air conditioner according to an embodiment of the present invention.
Figure 2:
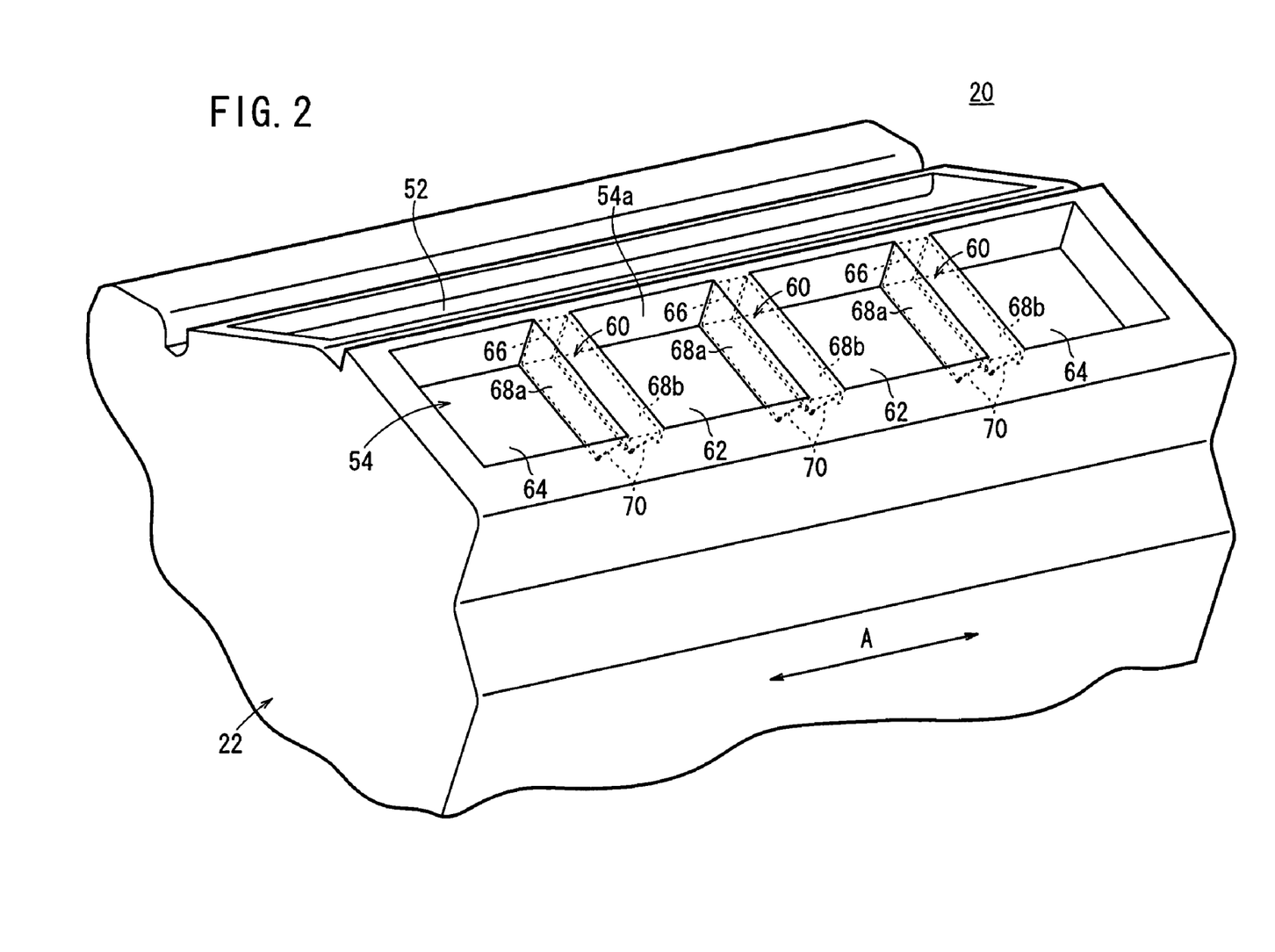
FIG. 2 is a fragmentary perspective view, as viewed from above, of the vehicular air conditioner shown in FIG. 1.
Figure 3:
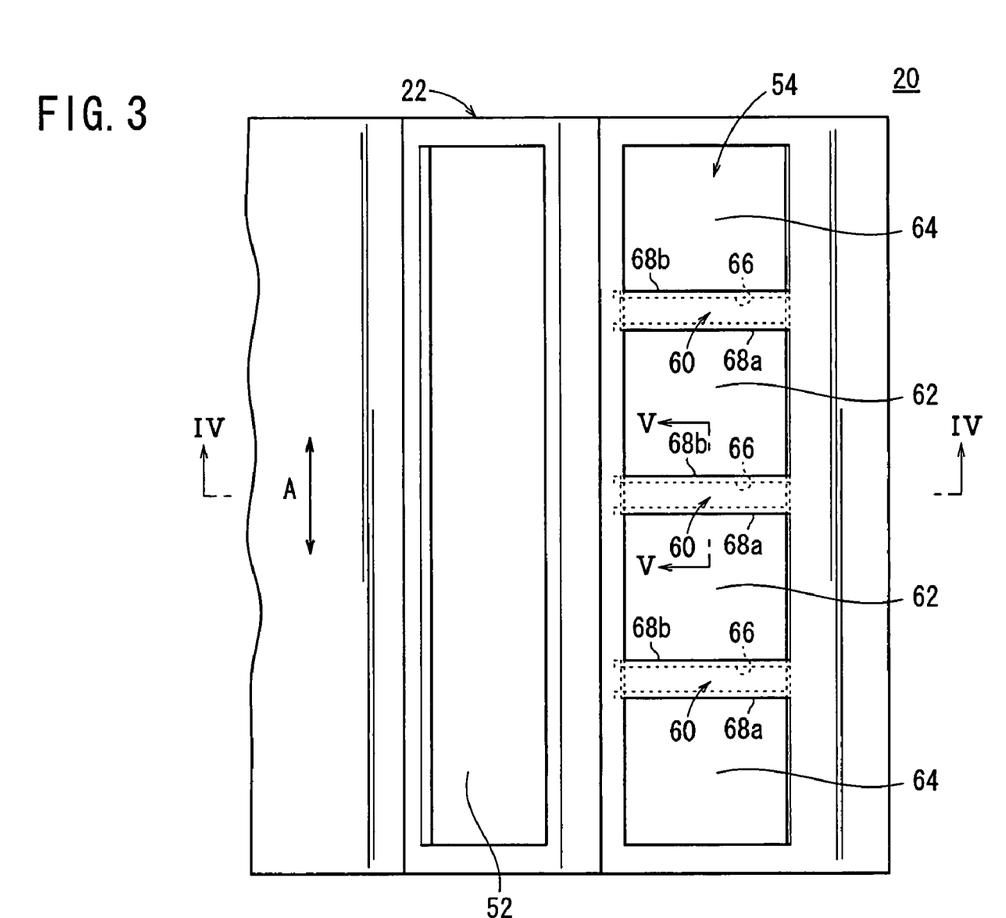
FIG. 3 is a fragmentary plan view of the vehicular air conditioner shown in FIG. 2.

FIG. 1 shows in vertical cross section a vehicular air conditioner 20 according to an embodiment of the present invention. FIG. 2 shows in fragmentary perspective, as viewed from above, the vehicular air conditioner 20 shown in FIG. 1. FIG. 3 shows in fragmentary plan the vehicular air conditioner 20 shown in FIG. 2.

As shown in FIGS. 1 through 3, the vehicular air conditioner 20 has a housing 22 defining various passages of air therein, an evaporator (cooling unit) 24 disposed in the housing 22 for cooling air, a heater core (heating unit) 26 disposed in the housing 22 for heating air, an air mixing door 28 for mixing cooled air and heated air with each other at a predetermined mixing ratio to produce mixed air adjusted in temperature, and first and second discharge outlet doors 30, 32 for selecting outlets for the mixed air. The housing 22 is placed in a vehicle such that an upper portion of the housing 22 shown in FIG. 1 is oriented upwardly in the vehicle and a lower portion of the housing 22 shown in FIG. 1 is oriented downwardly in the vehicle.

The housing 22 defines therein an inlet passage 34 disposed upstream of the evaporator 24 for being supplied with air from a blower fan, not shown, and first and second passages 38, 40 disposed downstream of the evaporator 24 and divided from each other by the air mixing door 28. The first passage 38 includes a first opening 42, that is open upwardly, which has its opening size adjustable by the air mixing door 28. The second passage 40 includes a second opening 44, that is open downwardly, which has its opening size adjustable by the air mixing door 28.

The air mixing door 28 is angularly movable about a shaft 46 mounted in the housing 22. When the air mixing door 28 is angularly moved to the first opening 42, it closes the first opening 42. When the air mixing door 28 is angularly moved to the second opening 44, it closes the second opening 44.

The heater core 26 is disposed downstream of the second passage 40. The housing 22 defines therein a third passage 48 disposed downstream of the heater core 26. The third passage 48 extends upwardly in the housing 22 along a side surface of the heater core 26 and is bent such that the third passage 48 has an upper end facing and communicating with the first opening 42.

A mixing portion 50 for mixing the cooled air from the evaporator 24 and the heated air from the heater core 26 with each other is defined in a region in the housing 22 where the third passage 48 and the first opening 42 are joined to each other. The first discharge outlet door 30 is disposed in the mixing portion 50 for adjusting the opening size of a defroster outlet 52. The second discharge outlet door 32 is also disposed in the mixing portion 50 for adjusting the amount of air supplied to a face outlet (first outlet) 54, a foot discharge passage 56, and a rear seat discharge passage (second passage) 58.

The first and second discharge outlet doors 30, 32 are angularly movably supported on respective shafts 46 mounted in the housing 22. The first discharge outlet door 30 is positioned for selectively closing the defroster outlet 52. The second discharge outlet door 32 is positioned for selectively closing the face outlet 54 or the foot discharge passage 56. The defroster outlet 52 is defined above the first opening 42 and is open upwardly of the housing 22.

As shown in FIG. 3, the face outlet 54 is of a substantially elongate rectangular shape and is disposed above the third passage 48. The face outlet 54 is open upwardly of the housing 22 and extends adjacent and substantially parallel to the defroster outlet 52. The face outlet 54 communicates with a mixed air passage (first passage) 36 (see FIG. 1) which faces the face outlet 54 for passing therethrough mixed air produced in the mixing portion 50. The mixed air passage 36 provides fluid communication between the mixing portion 50 and the rear seat discharge passage 58.

As shown in FIGS. 2 and 3, the substantially elongate rectangular face outlet 54 is divided into a plurality of segments along the directions indicated by the arrow A, by a plurality of (e.g., three) dividing ribs (dividing members) 60. Specifically, the face outlet 54 is divided by the dividing ribs 60 into a pair of center face outlets 62 disposed substantially centrally in the face outlet 54 and a pair of side face outlets 64 disposed adjacent to the respective center face outlets 62 in each of the opposite ends of the face outlet 54. The center face outlets 62 communicate with an outlet port disposed near a central console (not shown) in the vehicle. The side face outlets 64 communicate with respective outlet ports that are positioned at front seats, i.e., driver and passenger seats, in the vehicle. The center face outlets 62 and the side face outlets 64 have substantially equal opening areas.

The face outlet 54 has an inner end disposed near the defroster outlet 52 and constructed as a joint wall 54a projecting a predetermined distance into the mixed air passage 36.

Each of the dividing ribs 60 is of a substantially U-shaped cross section and is open into the housing 22. Each of the dividing ribs 60 extends linearly to interconnect the inner end of the face outlet 54 disposed near the defroster outlet 52 and an opposite inner end of the face outlet 54 disposed near the rear seat discharge passage 58. The dividing ribs 60 serve to increase the mechanical strength of the region of the housing 22 in the vicinity of the face outlet 54 and also to separate the center face outlets 62 and the side face outlets 64.

Figure 4:
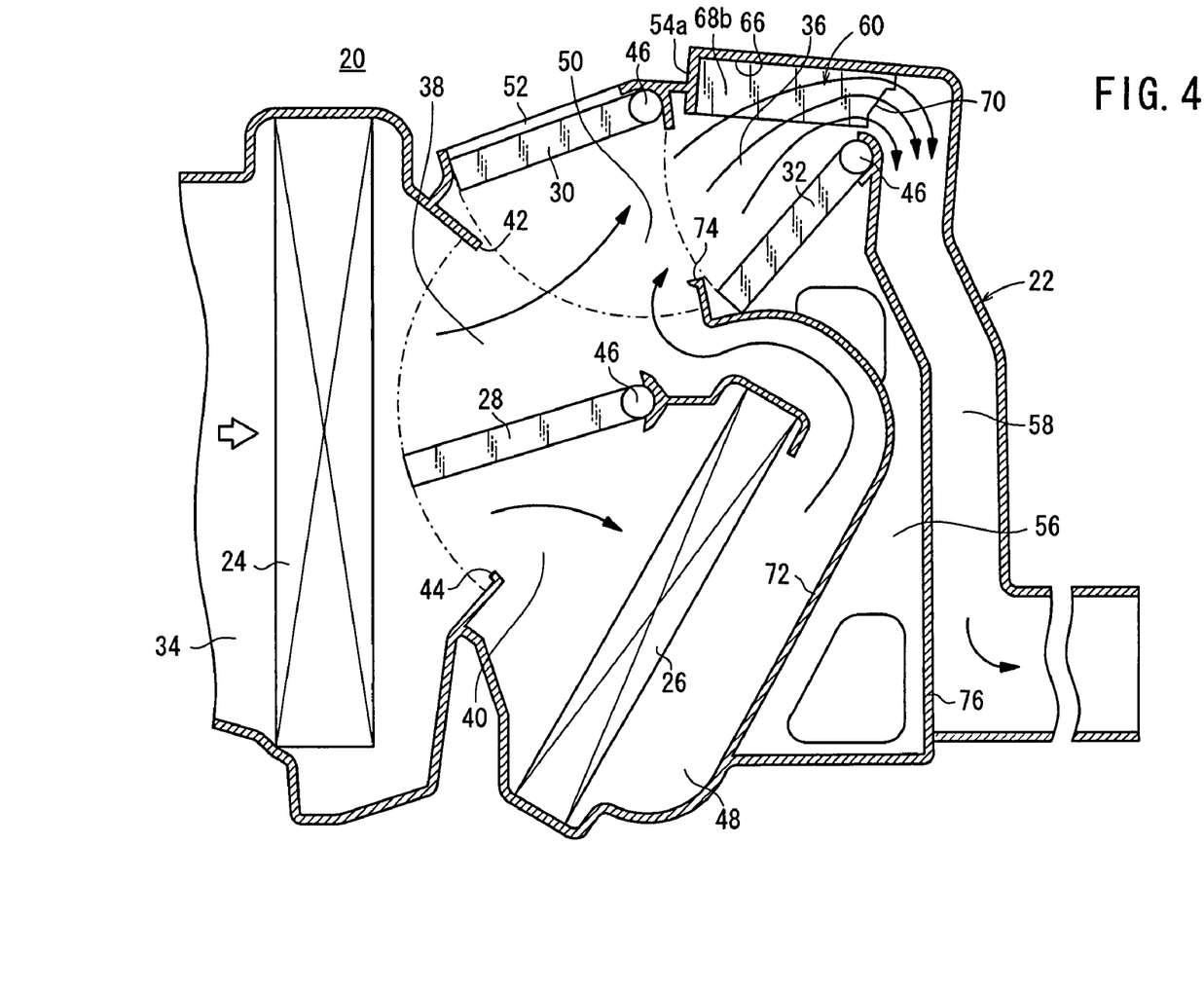
FIG. 4 is a vertical cross-sectional view of the vehicular air conditioner taken along line IV-IV of FIG. 3.
Figure 5:
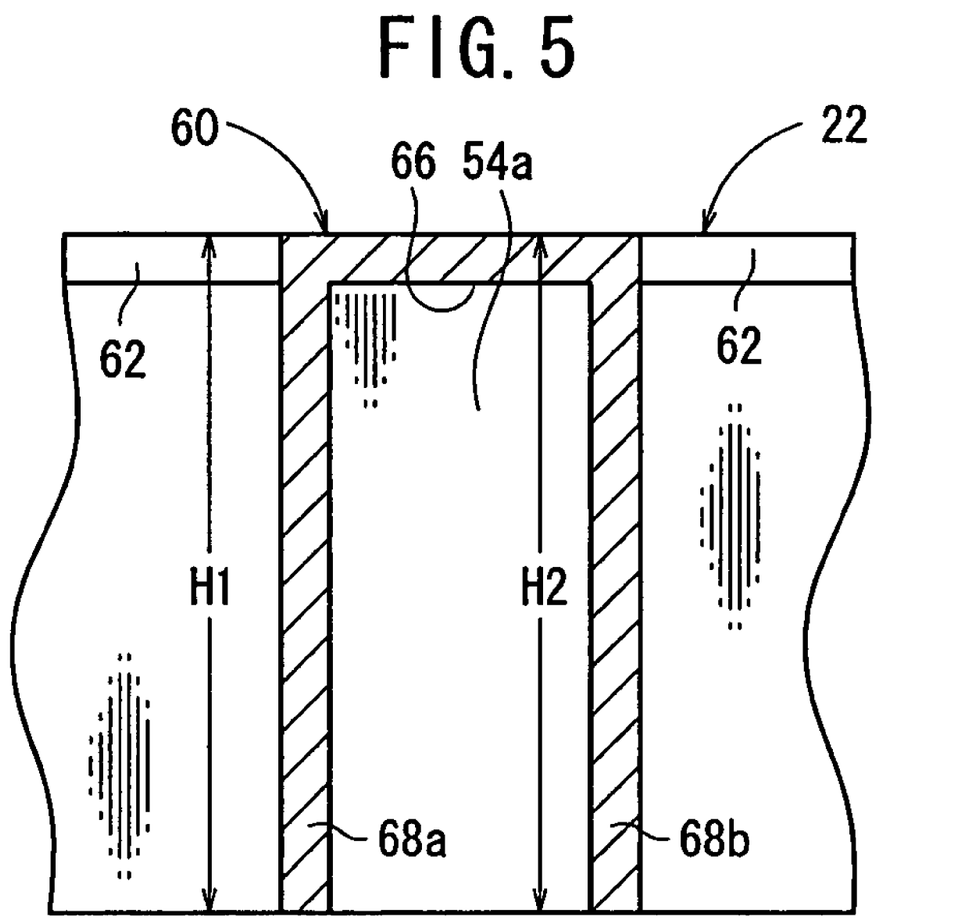
FIG. 5 is a vertical cross-sectional view of the vehicular air conditioner taken along line V-V of FIG. 3.

As shown in FIGS. 4 and 5, each of the dividing ribs 60 has a communication path (refluxing path) 66 defined therein which is open downwardly in facing relation to the mixing portion 50. The communication path 66 is concave in a direction away from the mixing portion 50 and extends in the longitudinal direction of the dividing rib 60.

Each of the dividing ribs 60 has a pair of laterally spaced walls 68a, 68b disposed respectively on the opposite sides of the communication path 66. The communication path 66 has an end disposed near the defroster outlet 52 and closed by the joint wall 54a of the housing 22. In other words, the walls 68a, 68b have ends joined to each other by the joint wall 54a.

The walls 68a, 68b have respective heights H1 which are substantially the same as each other to the upper surface of the dividing rib 60. The joint wall 54a has a height H2 which is substantially the same as the height H1 of the walls 68a, 68b (H1≈H2). Stated otherwise, each of the dividing ribs 60 has its walls 68a, 68b extending a predetermined distance toward the mixing portion 50, and covers a portion of the face outlet 54 (see FIG. 3). The walls 68a, 68b may alternatively have different heights H1.

The walls 68a, 68b have respective recesses 70 defined in their ends near the rear seat discharge passage 58 at a predetermined angle. The recesses 70 are inclined downwardly progressively away from the rear seat discharge passage 58.

Figure 6:
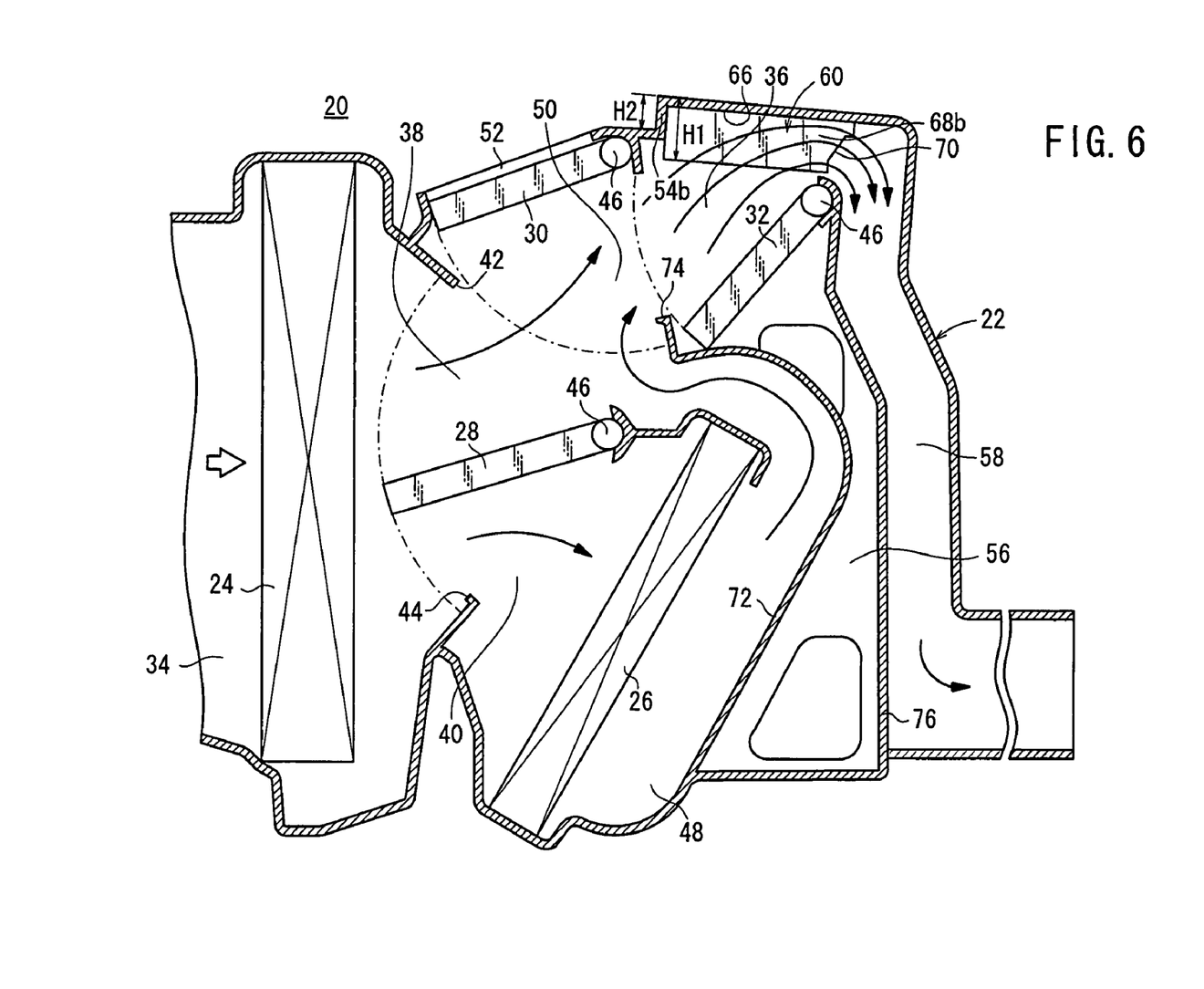
FIG. 6 is a vertical cross-sectional view of a modified vehicular air conditioner which differs from the vehicular air conditioner shown in FIG. 4 in that the height of a joint wall of a housing is reduced.

The height H2 of the joint wall 54a is not limited to being substantially the same as the height H1 of the walls 68a, 68b. Rather, as shown in FIG. 6, the height H2 of a joint wall 54b may be smaller than the height H1 of the walls 68a, 68b (H2<H1) for introducing the mixed air from the mixing portion 50 more efficiently through the communication path 66 into the rear seat discharge passage 58.

The foot discharge passage 56 is disposed adjacent to the third passage 48 with a boundary wall 72 interposed therebetween, and is held in fluid communication with foot outlet ports (not shown) that is open near the feet of passengers in the vehicle. A third opening 74 is defined in the upper end of the foot discharge passage 56 in fluid communication with the mixing portion 50. The opening size of the third opening 74 can be adjusted by the second discharge outlet door 32.

The rear seat discharge passage 58 is disposed adjacent to the foot discharge passage 56 with a boundary wall 76 interposed therebetween, and extends downwardly in the housing 22 substantially parallel to the foot discharge passage 56. The rear seat discharge passage 58 has a lower end portion extending toward the rear seats in the vehicle, and is held in fluid communication with rear seat face outlet ports, not shown. The rear seat discharge passage 58 has an upper end disposed near the face outlet 54.

The vehicular air conditioner 20 according to the embodiment of the present invention is basically constructed as described above. Operation and advantages of the vehicular air conditioner 20 will be described in detail below.

When the vehicular air conditioner 20 starts to operate, the blower fan, not shown, is rotated to introduce air from the inlet passage 34 into the housing 22. The introduced air is cooled when it passes through the evaporator 24, and is supplied as cooled air to at least one of the first passage 38 and the second passage 40.

If the air mixing door 28 is angularly positioned as shown in FIG. 1, the cooled air supplied to the first passage 38 is introduced into the mixing portion 50. The cooled air supplied to the second passage 40 is heated by the heater core 26, and the heated air is introduced through the third passage 48 into the mixing portion 50.

The cooled air and the heated air are mixed with each other in the mixing portion 50. The mixed air is then discharged into the passenger compartment of the vehicle from the face outlet 54, the defroster outlet 52, the foot outlet ports, or the rear seat face outlet ports (second outlet) which are selected depending on settings of the vehicular air conditioner 20.

For example, a face mode of operation of the vehicular air conditioner 1 will be described below. In the face mode, as shown in FIG. 1, the first discharge outlet door 30 closes the defroster outlet 52, bringing the mixing portion 50 into fluid communication with the face outlet 54, and the second discharge outlet door 32 closes the third opening 74, bringing the mixing portion 50 into fluid communication with the face outlet 54 and the rear seat discharge passage 58.

The mixed air produced in the mixing portion 50 flows from the mixing portion 50 through the mixed air passage 36 and the face outlet 54 into the passenger compartment of the vehicle. Part of the mixed air flowing through the mixed air passage 36 flows along the second discharge outlet door 32 near the second discharge outlet door 32 into the rear seat discharge passage 58. The mixed air then flows from the rear seat discharge passage 58 into the passenger compartment via the rear seat face outlet ports (not shown).

As shown in FIG. 4, part of the mixed air that is flows from the face outlet 54 into the passenger compartment is introduced into the communication path 66 defined in each of the dividing ribs 60. The mixed air thus flows through the communication path 66 into the rear seat discharge passage 58. Therefore, the mixed air including cooled air flowing along the upper portion of the housing 22 is discharged through the rear seat discharge passage 58 toward the rear seats in the passenger compartment.

Specifically, part of the cooled air flowing along the upper portion of the housing 22 is forced to flow through the communication path 66 into the rear seat discharge passage 58. Consequently, the amount of cooled air flowing through the rear seat discharge passage 58 is increased thereby to lower the temperature of the mixed air that is supplied to the rear seats in the passenger compartment. In this manner, the difference between the temperatures of the mixed air supplied to the front seats and the mixed air supplied to the rear seats is reduced, resulting in little difference between the temperature at the front seats and the rear seats.

Figure 7:
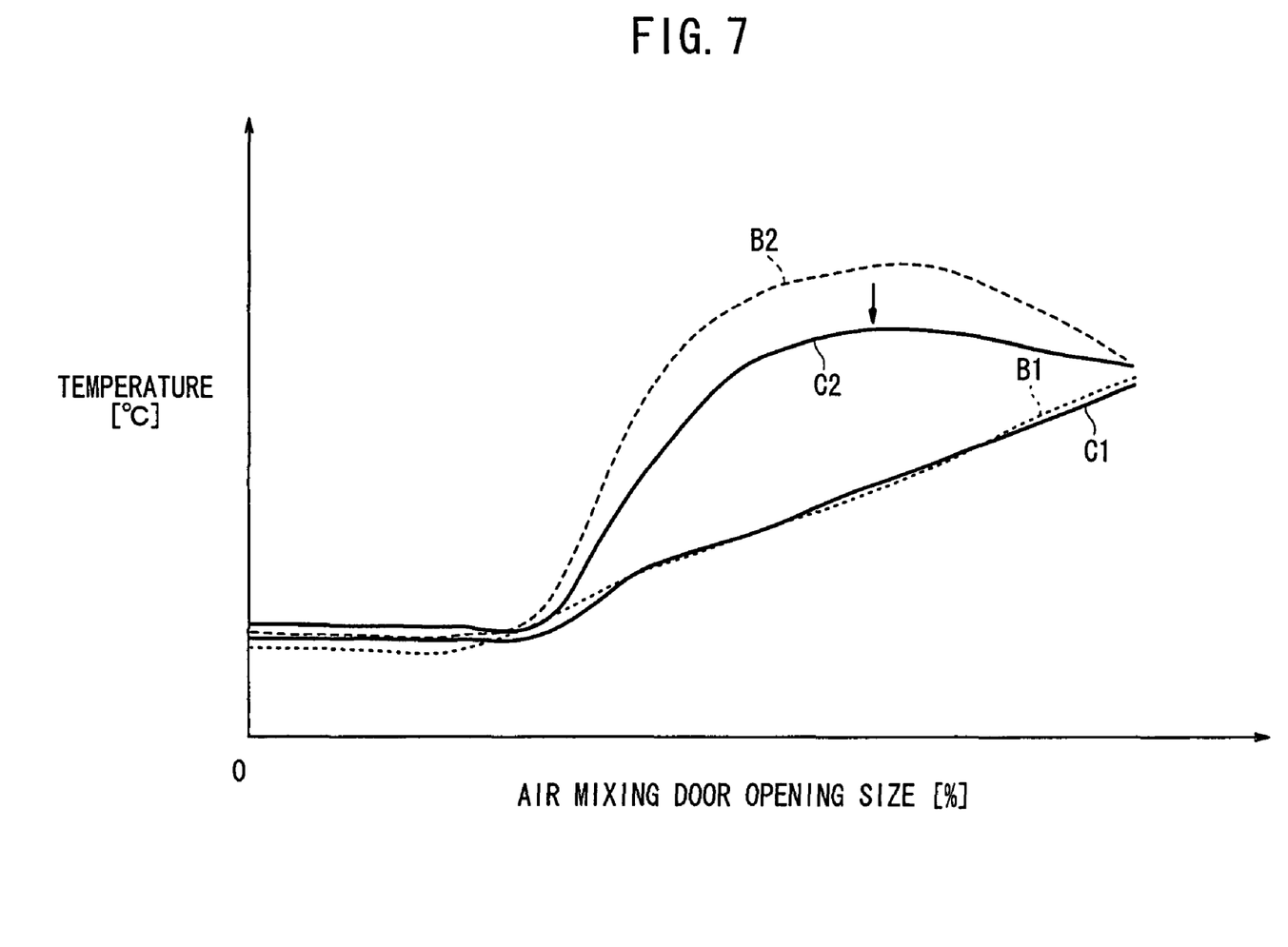
FIG. 7 is a diagram of characteristic curves representing the relation between temperatures of mixed air supplied to front and rear seats and air mixing door opening sizes in a vehicle incorporating the vehicular air conditioner shown in FIG. 1.

FIG. 7 shows characteristic curves representing the relationship between temperatures of mixed air supplied from the face outlet 54 to the front seats and mixed air supplied from the rear seat face outlet ports to the rear seats, and air mixing door opening sizes in the face mode. The air mixing door 28 is fully closed (door opening size: 0%) when the air mixing door 28 closes the second opening 44, and is fully open (door opening size: 100%) when the air mixing door 28 closes the first opening 42.

In FIG. 7, the broken-line curves B1, B2 represent characteristic values plotted when each of the dividing ribs 60 has no communication path 66 in a vehicular air conditioner, and the solid-line curves C1, C2 represent characteristic values plotted when each of the dividing ribs 60 has the communication path 66 in the vehicular air conditioner 20 according to the present embodiment. Specifically, the characteristic curves B1, C1 are plotted when the mixed air is supplied from the face outlet 54 to the front seats, and the characteristic curves B2, C2 are plotted when the mixed air is supplied from the rear seat face outlet ports to the rear seats.

It can be seen from the characteristic curves shown in FIG. 7 that with the vehicular air conditioner 20 according to the present embodiment in which each of the dividing ribs 60 has the communication path 66, the temperature of the mixed air supplied from the face outlet 54 to the front seats remains unchanged, and the temperature of the mixed air supplied from the rear seat face outlet ports to the rear seats is lowered as indicated by the arrow in FIG. 7, resulting in a reduction in the temperature difference between the front seats and the rear seats in the passenger compartment.

Since the divided ribs 60 disposed in the face outlet 54 are effective to supply cooled air to the rear seat discharge passage 58, therefore, the difference between the temperature of the mixed air supplied from the face outlet 54 to the front seats and the temperature of the mixed air supplied from the rear seat discharge passage 58 to the rear seats is reduced in the face mode.

In addition, because the amount of mixed air supplied to the rear seat discharge passage 58 is greater than that in the case where each of the dividing ribs 60 has no communication path 66, the mixed air is supplied in a sufficient amount to the rear seats. The communication path 66 provided in each of the dividing ribs 60 is thus effective to supply mixed air whose temperature has well been adjusted to the rear seats and also to supply a sufficient amount of mixed air to the rear seats.

Figure 8:
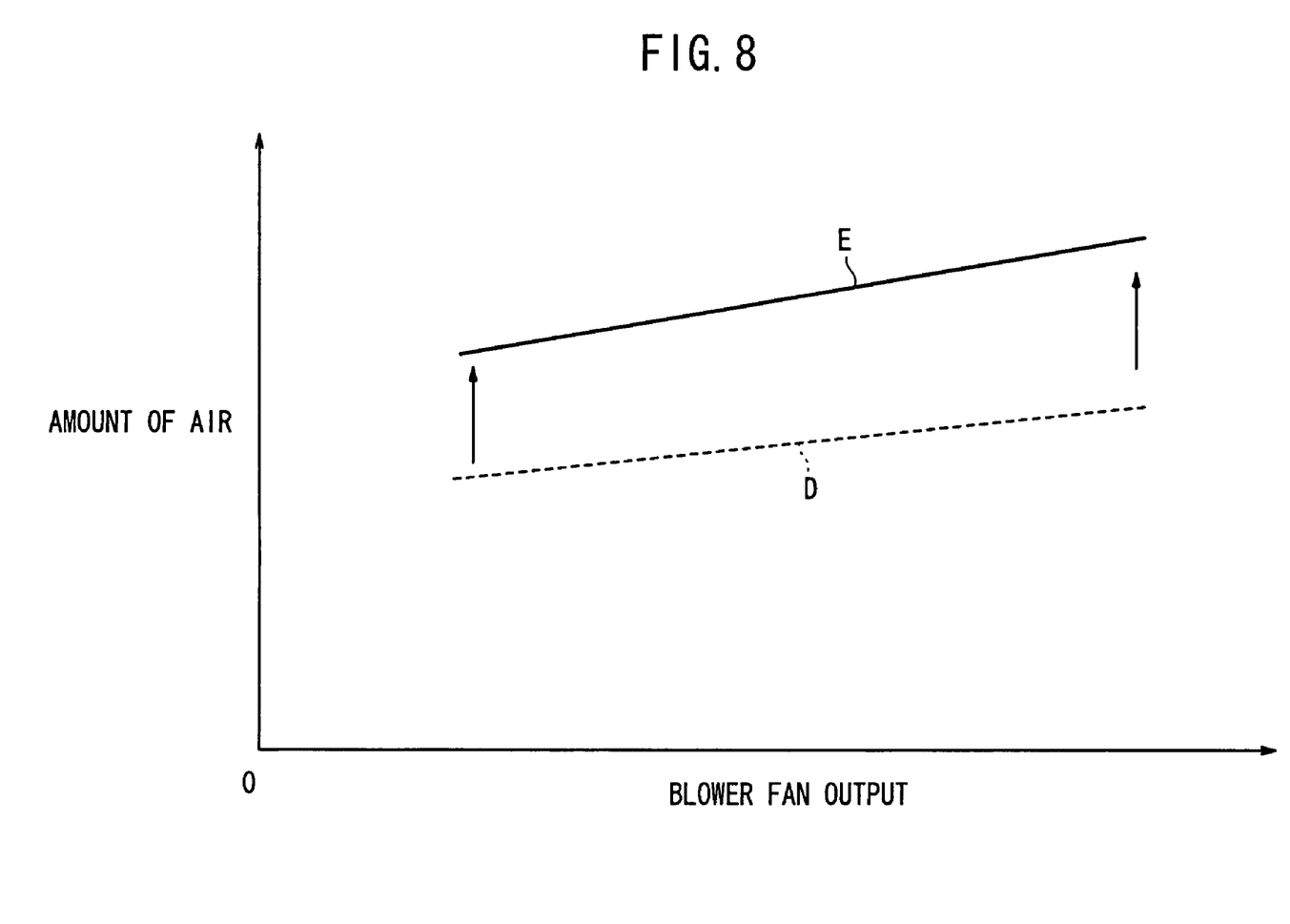
FIG. 8 is a diagram of characteristic curves representing the relation between the outputs of a blower fan for supplying air to a housing and the amounts of mixed air supplied to the rear seats in the vehicle incorporating the vehicular air conditioner shown in FIG. 1.

FIG. 8 shows characteristic curves representing the relation between the outputs of a blower fan for supplying air to the vehicular air conditioner 20 and the amounts of mixed air supplied from the rear seat face outlet ports to the rear seats. The broken-line curve D represents characteristic values plotted when each of the dividing ribs 60 has no communication path 66 in a vehicular air conditioner, and the solid-line curve E represents characteristic values plotted when each of the dividing ribs 60 has the communication path 66 in the vehicular air conditioner 20 according to the present embodiment.

It can be understood from the characteristic curves shown in FIG. 8 that with the vehicular air conditioner 20 according to the present embodiment in which the dividing ribs 60, each having the communication path 66, are disposed in the face outlet 54, the amount of mixed air flowing from the rear seat face outlet ports to the rear seats is increased (see the arrow in FIG. 8).

According to the present embodiment, as described above, since the dividing ribs 60 each having the communication path 66 that is open into the housing 22 are disposed in the face outlet 54 of the vehicular air conditioner 20, part of the mixed air that is supplied from the mixing portion 50 to the rear seat discharge passage 58 is introduced into the communication path 66 and then supplied from the communication path 66 to the rear seat discharge passage 58. Therefore, the mixed air including the cooled air is effectively supplied to the rear seat discharge passage 58, reducing the difference between the temperature of the mixed air supplied from the face outlet 54 to the front seats and the temperature of the mixed air supplied from the rear seat discharge passage 58 to the rear seats.

Furthermore, because the amount of mixed air supplied to the rear seat discharge passage 58 is increased, the mixed air is supplied in a sufficient amount to the rear seats. As a result, the passenger compartment is well air-conditioned without making passengers on the rear seats uncomfortable.

A bi-level mode of operation of the vehicular air conditioner 1 will be described below. In the bi-level mode, the second discharge outlet door 32 is spaced away from the third opening 74, bringing the mixing portion 50 into fluid communication with the foot discharge passage 56. The mixed air produced in the mixing portion 50 flows from the mixing portion 50 through the face outlet 54 into the passenger compartment of the vehicle. The mixed air also flows from the third opening 74 through the foot discharge passage 56 and the foot outlet ports into the passenger compartment. Part of the mixed air flowing through the mixed air passage 36 flows through the communication paths 66 of the dividing ribs 60 into the rear seat discharge passage 58. Consequently, the amount of mixed air flowing through the rear seat discharge passage 58 is increased, and the temperature of the mixed air supplied to the rear seats is lowered.

A foot/defroster mode of operation of the vehicular air conditioner 1 will be described below. In the foot/defroster mode, the first discharge outlet door 30 is angularly moved to open the defroster outlet 52, and the second discharge outlet door 32 is angularly moved to the face outlet 54, closing the face outlet 54. The mixed air produced in the mixing portion 50 flows from the mixing portion 50 through the defroster outlet 52 into the passenger compartment. The mixed air also flows through the foot discharge passage 56 and the foot outlet ports into the passenger compartment.

Figure 9:
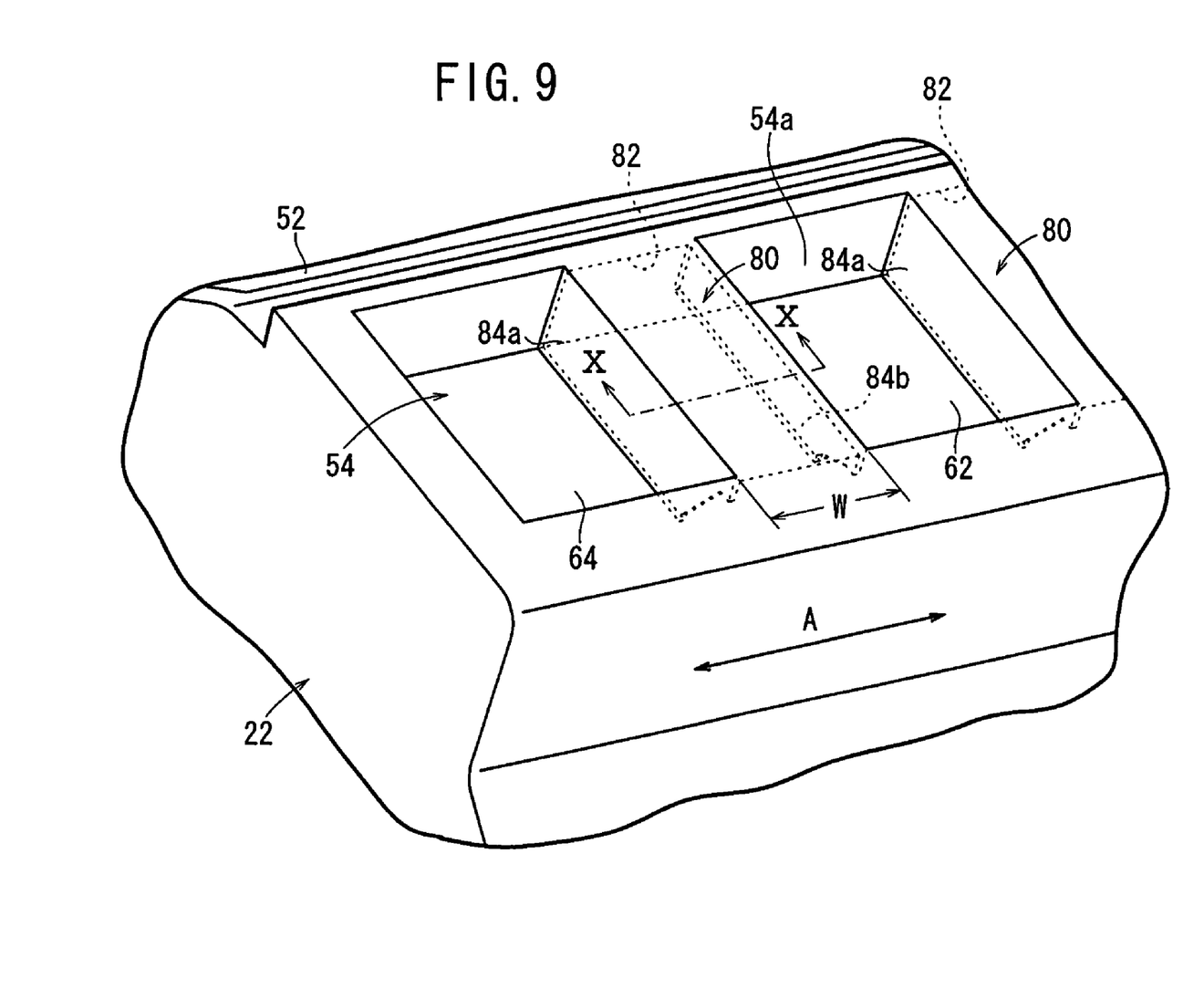
FIG. 9 is an enlarged fragmentary perspective view of an upper portion of a vehicular air conditioner with divided ribs according to a first modification.
Figure 10:
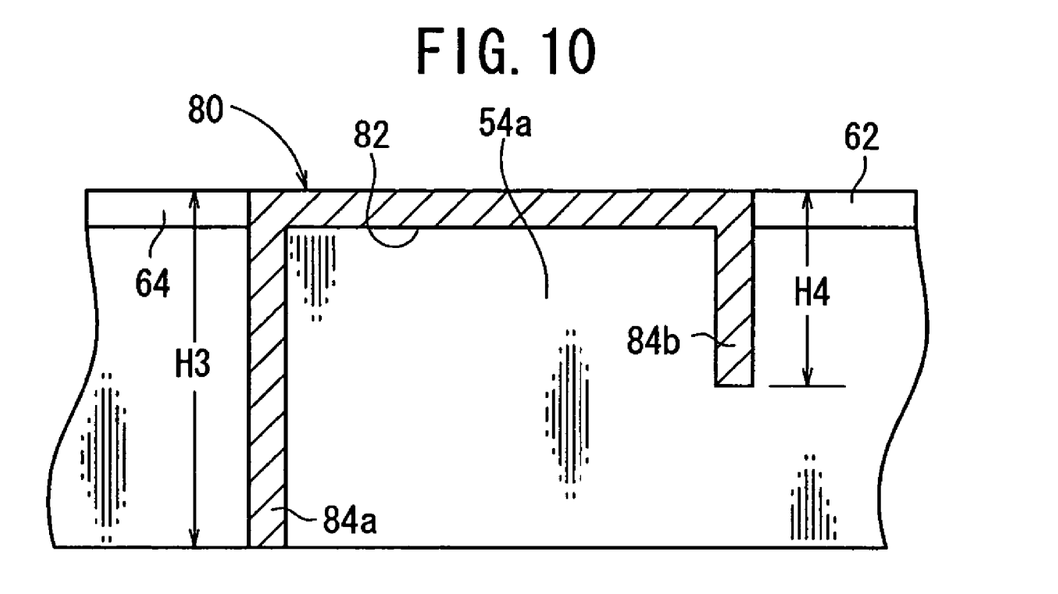
FIG. 10 is a vertical cross-sectional view of the vehicular air conditioner taken along line X-X of FIG. 9.

FIGS. 9 and 10 show a vehicular air conditioner according to a first modification. According to the first modification, dividing ribs 80 are wider than the dividing ribs 60 shown in FIG. 2 and have respective communication paths 82 defined therein. The wider dividing ribs 80 are effective to further increase the amount of mixed air supplied from the mixing portion 50 through the communication paths 82 to the rear seat discharge passage 58. Stated otherwise, the ratio of the opening area of the face outlet 54 divided by the dividing ribs 80 and the surface area of the dividing ribs 80 covering the face outlet 54 can be changed.

By thus increasing the width W of each of the dividing ribs 80, the ratio of the mixed air flowing through the face outlet 54 between the dividing ribs 80 to the front seats in the passenger compartment and the mixed air flowing through the communication paths 82 and the rear seat discharge passage 58 to the rear seats in the passenger compartment can be set to a desired value. In other words, as the width W of each of the dividing ribs 80 increases, the amount of mixed air supplied to the rear seats increases, and the amount of mixed air supplied to the front seats decreases.

As a result, the mixed air supplied through the communication paths 82 and the rear seat discharge passage 58 to the rear seats includes a greater amount of cooled air, further reducing the difference between the temperature of the mixed air supplied from the face outlet 54 to the front seats and the temperature of the mixed air supplied from the rear seat discharge passage 58 to the rear seats.

As shown in FIG. 10, each of the dividing ribs 80 has a pair of laterally spaced walls 84a, 84b disposed respectively on the opposite sides of the communication path 82. The walls 84a, 84b may have different heights H3, H4, respectively, from the upper surface of the dividing rib 80. For example, the wall 84a is positioned closely to one of the center face outlets 62 and the wall 84b is positioned closely to one of the side face outlets 64, with the height H3 of the wall 84a being greater than the height H4 of the wall 84b (H3>H4). Because of the height difference, the mixed air flowing through the communication paths 82 of the dividing ribs 80 finds it easier to flow over the lower wall 84b into the center face outlet 62 than to flow over the higher wall 84a into the side face outlet 64.

Stated otherwise, the amount of mixed air flowing through the communication paths 82 flows in a greater amount into the center face outlet 62 and flows in a smaller amount into the side face outlet 64.

By thus differentiating the heights H3, H4 of the walls 84a, 84b of the dividing ribs 80, the ratio of mixed air supplied to the center face outlets 62 and mixed air supplied to the side face outlets 64 is adjusted to a desired value.

The higher walls 84a are not limited to being positioned closely to the side face outlets 64. Instead, the higher walls 84a may be positioned closely to the center face outlets 62 and the lower walls 84b may be positioned closely to the side face outlets 64.

Figure 11:
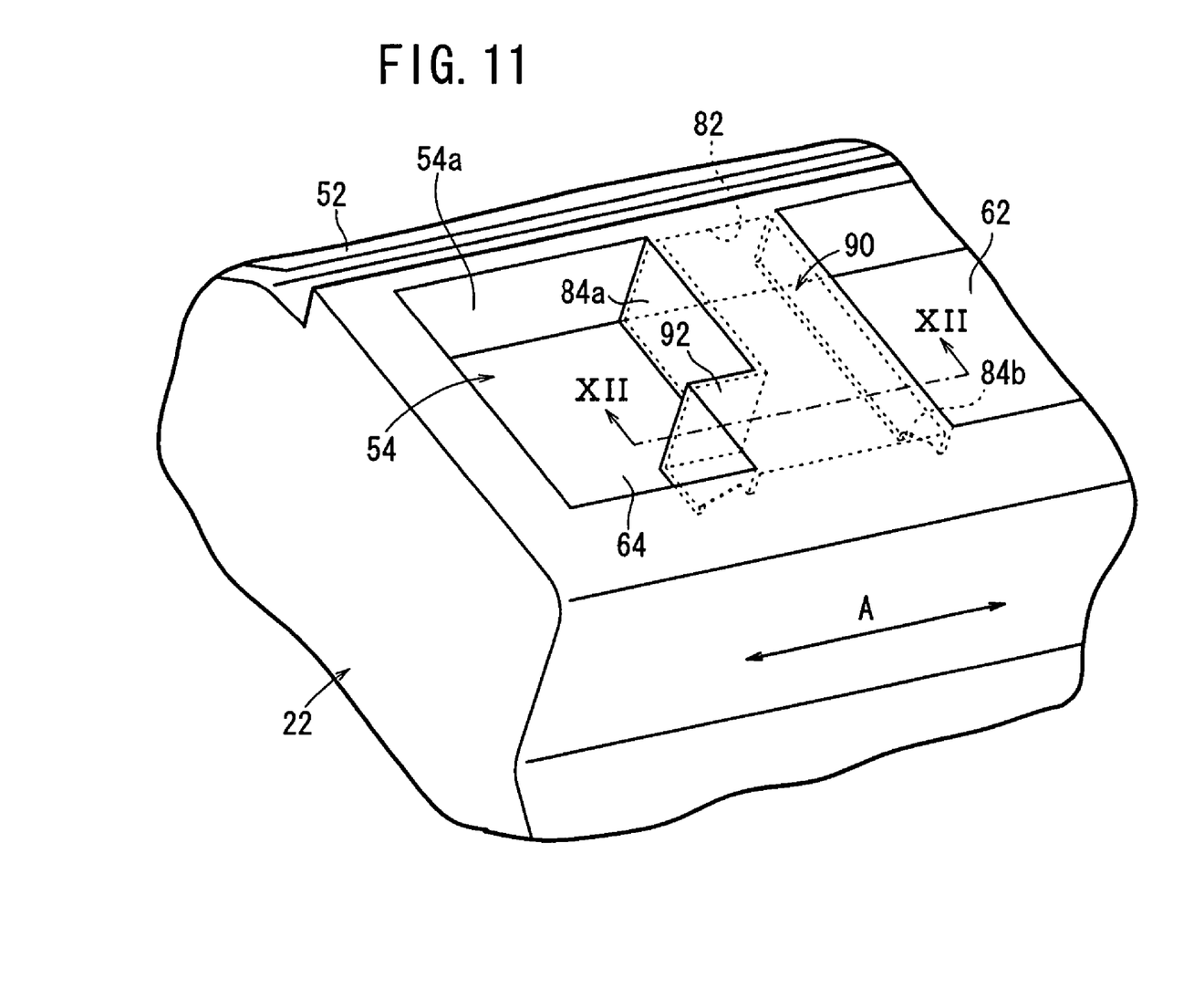
FIG. 11 is an enlarged fragmentary perspective view of an upper portion of a vehicular air conditioner with divided ribs according to a second modification.
Figure 12:
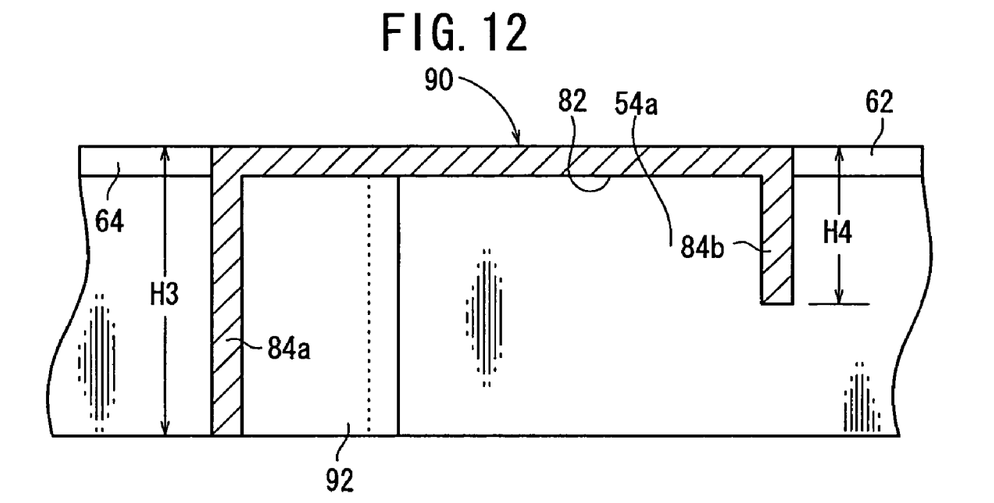
FIG. 12 is a vertical cross-sectional view of the vehicular air conditioner taken along line XII-XII of FIG. 11.

FIGS. 11 and 12 show a vehicular air conditioner according to a second modification. According to the second modification, dividing ribs 90 have respective wider portions 92 disposed closer to the rear seat discharge passage 58 and having a greater width in the lateral direction indicated by the arrow A in FIG. 11, thereby increasing the amount of mixed air supplied to the rear seat discharge passage 58 and also reducing the difference between the opening area of the face outlet 54 divided by the dividing ribs 90 and the surface area of the dividing ribs 90 covering the face outlet 54. Accordingly, the difference between the amount of the mixed air supplied from the face outlet 54 to the front seats and the amount of the mixed air supplied from the rear seat discharge passage 58 through the rear seat face outlet ports to the rear seats is reduced.

Stated otherwise, the amount of the mixed air supplied from the rear seat face outlet ports to the rear seats is made greater than the amount of the mixed air supplied from the face outlet 54. As a result, the difference between the temperature of the mixed air supplied from the face discharge outlet 54 to the front seats and the temperature of the mixed air supplied from the rear seat discharge passage 58 to the rear seats is reduced. The wider portions 92 are not limited to being positioned closely to the side face outlets 64. Instead, the wider portions 92 may be positioned closely to the center face outlets 62.

In the vehicular air conditioner 20 described above, the dividing ribs 60 are integrally formed with the face outlet 54 in the housing 22. However, the dividing ribs 60 may be made movable in the lateral direction indicated by the arrow A along the face outlet 54.

For example, a pair of guide rails may be mounted on inner wall surfaces of the face outlet 54 so as to extend along the face outlet 54, and the dividing ribs 60 may be movably mounted in engagement with the guide rails for movement along the guide rails. After the dividing ribs 60 are moved to desired positions, the dividing ribs 60 may be fixed in position with respect to the face outlet 54 by a stopper mechanism, not shown.

When the dividing ribs 60 are moved, the ratio of an opening area of the center face outlets 62 to an opening area of the side face outlets 64 in the face outlet 54 is adjusted to a desired value. Therefore, the ratio of an amount of mixed air supplied through the center face outlets 62 to an amount through the side face outlets 64 is adjusted as desired.

Although certain preferred embodiments of the present invention have been shown and described in detail, it should be understood that various changes and modifications may be made therein without departing from the scope of the appended claims.

What is claimed is:

1. A vehicular air conditioner comprising:
   a cooling unit for cooling air and supplying the cooled air;
   a heating unit for heating air and supplying the heated air;
   an air mixing door for mixing the cooled air and the heated air with each other at a given mixing ratio in a mixing portion; and
   a plurality of outlet ports for discharging mixed air produced in said air mixing door into respective regions in a vehicle;
   wherein said plurality of outlet ports include a first outlet port for supplying said mixed air to front seats in the vehicle and a second outlet port for supplying said mixed air to a rear seat in the vehicle; and
   wherein said vehicular air conditioner further comprises a first passage for guiding said mixed air from said mixing portion to said first outlet port;
   a second passage communicating with said first passage, for guiding said mixed air to said second outlet port;
   a refluxing path which is open into said first passage, for changing the direction of said mixed air guided to said first outlet port and guiding the mixed air to said second passage, the refluxing path being defined in a dividing rib, the dividing rib dividing the first outlet port into a center outlet and a side outlet.

2. A vehicular air conditioner according to claim 1, wherein said refluxing path covers a portion of said first outlet port said refluxing path extending in said first outlet port from said first passage to said second passage.

3. A vehicular air conditioner according to claim 2, wherein said refluxing path has a pair of walls extending along the direction in which said mixed air flows in said refluxing path.

4. A vehicular air conditioner according to claim 3, wherein said refluxing path has a joint wall disposed at an end thereof, said joint wall extending substantially perpendicularly to said direction in which said mixed air flows in said refluxing path, and facing said first passage, said joint wall interconnecting said pair of walls.

5. A vehicular air conditioner according to claim 4, wherein said refluxing wall has a width substantially perpendicular to said direction in which said mixed air flows in said refluxing path, said width being changed to adjust the amount of the mixed air supplied from said second passage to the rear seat in the vehicle.

6. A vehicular air conditioner according to claim 5, wherein said width of said refluxing path is greater at a position close to said second passage than that at a position close to said first passage.

7. A vehicular air conditioner according to claim 4, wherein said joint wall is disposed at the end of said refluxing path which is close to said first passage, for limiting the flow of said mixed air in said refluxing path.

8. A vehicular air conditioner according to claim 7, wherein said joint wall has a height substantially equal to or smaller than the height of said pair of walls.

9. A vehicular air conditioner according to claim 2, wherein said dividing member interconnects an inner end face of said first outlet port which is close to said first passage and an inner end face of said first outlet port which is close to said second passage.

10. A vehicular air conditioner according to claim 2, wherein said dividing member is of a U-shaped cross section which is open into said first passage, said refluxing path extending in said dividing member in the longitudinal direction of said dividing member, said dividing member having a pair of walls extending along said refluxing path.

11. A vehicular air conditioner according to claim 3, wherein said walls have respective heights which are different from each other.

12. A vehicular air conditioner according to claim 1, wherein said center outlet is held in fluid communication with one of said outlet ports which is positioned centrally at a front seat in the vehicle, said side outlet is held in fluid communication with one of said outlet ports which is positioned laterally of the front seat in the vehicle.

* * * * *